United States Patent
Mitsuya et al.

(10) Patent No.: US 7,583,424 B2
(45) Date of Patent: Sep. 1, 2009

(54) HOLOGRAM INFORMATION REPRODUCING DEVICE

(75) Inventors: Shinji Mitsuya, Miyagi-ken (JP);
Naoyuki Tokuchi, Miyagi-ken (JP);
Yoshihiro Someno, Miyagi-ken (JP);
Yuichi Umeda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/952,400

(22) Filed: Dec. 7, 2007

(65) Prior Publication Data

US 2008/0137162 A1     Jun. 12, 2008

Related U.S. Application Data

(63) Continuation of application No. PCT/JP2006/311056, filed on Jun. 2, 2006.

(30) Foreign Application Priority Data

Jun. 7, 2005   (JP)   ............................. 2005-167379

(51) Int. Cl.
*G03H 1/28* (2006.01)
*G03H 1/22* (2006.01)
(52) U.S. Cl. .......................................... 359/24; 359/32
(58) Field of Classification Search .................. 359/22, 359/24, 25, 29, 32
See application file for complete search history.

(56) References Cited

U.S. PATENT DOCUMENTS 6,721,076 B2 *   4/2004   King et al. .................... 359/35

| 6,958,967 B2 | 10/2005 | Kasazumi et al. |
| 7,236,442 B2 | 6/2007 | Sugiki et al. |

(Continued)

FOREIGN PATENT DOCUMENTS

EP     1 531 466     5/2005

(Continued)

OTHER PUBLICATIONS

International Search Report dated Jul. 4, 2006 from corresponding International Application No. PCT/JP2006/311056.

(Continued)

*Primary Examiner*—Alessandro Amari
(74) *Attorney, Agent, or Firm*—Beyer Law Group LLP

(57) ABSTRACT

A hologram information reproducing device is described which can reproduce information from a recording medium on which hologram information is recorded, and which can be downsized. In one aspect, when light from a light source is emitted, the light is converted into parallel reference light, by a lens of an optical system. A mirror changes the orientation of the reference light so that it is oriented obliquely downward towards a recording medium. More specifically, as viewed from the top, the mirror changes a path of the light from the light source unit by approximately 90 degrees. In addition, as viewed from the side, the mirror changes the path of the light from the light source unit downward by approximately 45 degrees. Since an interference pattern recorded on the recording medium is a Bragg grating, when the reference light illuminates a recording area of the recording medium, a reproduction light is obtained by Bragg diffraction. The reproduction light is reflected by a reflecting layer of the recording medium and is detected by a photodetector 13.

11 Claims, 5 Drawing Sheets

U.S. PATENT DOCUMENTS

2005/0030876 A1  2/2005  Horimai
2006/0067179 A1  3/2006  Matsumoto et al.

FOREIGN PATENT DOCUMENTS

| JP | 2002-216359 | 8/2002 |
| JP | 2005-032306 | 2/2005 |
| JP | 2005-265977 | 9/2005 |
| JP | 2006-85834 | 3/2006 |

OTHER PUBLICATIONS

European Search Report dated Nov. 25, 2008 from European Application No. 06747100.3.

* cited by examiner (a)

(b)

(a)

(b)

HOLOGRAM INFORMATION REPRODUCING DEVICE

CROSS REFERENCE TO RELATED APPLICATION

This is a continuation of International Application No. PCT/JP2006/311056, filed Jun. 2, 2006, which is incorporated herein by reference in its entirety.

TECHNICAL FIELD

The present invention relates to a device that reproduces information recorded on a hologram recording medium.

BACKGROUND ART

Currently, as media on which a large amount of data is recorded, optical recording media, such as a CD (compact disk) and a DVD (digital versatile disk), are widely used. In recent years, there is a demand for recording a high-definition moving image and a demand for recording a larger amount of data due to the development of personal computers. In optical recording media, such as a CD or a DVD, a sufficiently high density cannot be achieved for recording such a large amount of data, as a result of which a large amount of data cannot be recorded on one disk. Therefore, for recording such a large amount of data, recording must be performed while replacing a plurality of disks. In recent years, a hologram recording medium on which a very large amount of data can be recorded compared to, for example, currently used CDs and DVDs is drawing attention.

Hologram information recording is a method in which a light beam is separated into two coherent light beams, data modulation is performed on one of the light beams by a spatial light modulator to form a signal light, and the other light beam is combined as reference light at a recording medium, so that data is recorded as an interference pattern. Then, by irradiating the recording medium with reference light that is the same as that used during the recording, the signal light can be detected as reproduction light, so that the data can be reproduced. In this hologram information recording/reproducing operation, when the light wavelength and irradiation angle during the reproduction of the information are different from the light wavelength and irradiation angle during the recording of the information, the signal light is not reproduced. By making use of this characteristic, the light wavelength and the irradiation angle during the recording/reproduction of the information are changed to perform multiplexing of data on the same area of the recording medium, as a result of which the data is recorded.

DISCLOSURE OF INVENTION

Problems to be Solved by the Invention

When information is recorded/reproduced as a result of changing the irradiation angle or the wavelength of light used for recording/reproducing the information (wavelength multiplexing or irradiation-angle multiplexing), the wavelength or the irradiation angle needs to be controlled with high precision. For example, when information is recorded onto/reproduced from a recording medium by irradiation-angle multiplexing, the irradiation angle is changed using a large, expensive galvanometer mirror. Therefore, a device becomes large and expensive.

In view of such points, it is an object of the present invention to provide a hologram information reproducing device which can reproduce information from a recording medium on which hologram information is recorded, and which can be downsized.

Means for Solving the Problems

According to a first aspect of the present invention, there is provided a hologram information reproducing device comprising a light source unit that emits reference light; an optical system that irradiates with the reference light, a recording medium on which information is recorded in a multiplex manner; and detecting means that is disposed on the same side as the light source unit with respect to the recording medium and that detects reproduction light that is obtained as a result of diffracting the reference light at the recording medium. The optical system includes a lens that transmits the reference light emitted from the light source unit, a mirror that directs the light transmitted through the lens towards the recording medium, and first driving means that changes the orientation of the lens. The first driving means changes the orientation of the lens in accordance with a multiplex direction of the information recorded on the recording medium when the information is reproduced from the recording medium.

According to this structure, the first driving means can drive the orientation of the lens independently in the multiplex direction and the arrangement direction, so the first driving means can drive the lens in the multiplex direction and the arrangement direction. Therefore, in reproducing hologram information, even if the light source unit is switched, the information can be precisely reproduced, and the hologram information on which angle multiplexing is performed can be precisely reproduced.

According to a second aspect of the present invention, there is provided a hologram information reproducing device comprising a light source unit that emits reference light; an optical system that irradiates with the reference light, a recording medium on which information is recorded; and detecting means that is disposed on the same side as the light source unit with respect to the recording medium and that detects reproduction light that is obtained as a result of diffracting the reference light at the recording medium. The optical system includes a cylinder, a mirror, and second driving means. The cylinder has integrated to the light source unit, a lens that transmits the reference light emitted from the light source unit. The mirror directs the light transmitted through the lens towards the recording medium. The second driving means drives the orientation of the cylinder.

According to this structure, the second driving means can drive the orientation of the cylinder, in which the lens and the light source unit are integrated, independently in the multiplex direction and the arrangement direction, so that the second driving means can drive the lens in the multiplex direction and the arrangement direction. Therefore, in reproducing hologram information, even if the light source unit is switched, the information can be precisely reproduced, and the hologram information on which angle multiplexing is performed can be precisely reproduced.

In the hologram information reproducing device according to the present invention, it is desirable that the first driving means or the second driving means change the orientation of the lens in a first direction in correspondence with the multiplex direction of the information recorded on the recording medium when the information is reproduced from the recording medium.

In the hologram information reproducing device according to the present invention, it is desirable that the light source unit have a light source array including a plurality of light sources, and the first driving means or the second driving means change the orientation of the lens in a second direction in correspondence with a direction of arrangement of the light sources in the light source array.

In the hologram information reproducing device according to the present invention, it is desirable that the first and second directions be substantially perpendicular to each other, and the first driving means or the second driving means change the orientation of the lens in the first direction and the second direction. In addition, it is desirable that the hologram information reproducing device further comprise controlling means that drives the first driving means in accordance with the multiplex direction of the information recorded on the recording medium, and that drives the second driving means in accordance with the direction of arrangement of the light sources in the light source array. According to this structure, the first driving means or the second driving means can drive the orientation of the lens independently in the first and second directions. Therefore, the first driving means or the second driving means can drive the lens in the first and second directions. Therefore, in reproducing hologram information, even if the light source unit is switched, the information can be precisely reproduced, and the hologram information on which angle multiplexing is performed can be precisely reproduced.

In the hologram information reproducing device according to the present invention, it is desirable that the first driving means or the second driving means drive the lens or the cylinder by a magnetic circuit.

In the hologram information reproducing device according to the present invention, it is desirable that the recording medium have reflecting means that reflects the reproduction light, obtained by diffracting the reference light, towards the detecting means.

Advantages of the Invention

In the hologram information reproducing device according to the present invention, the optical system that irradiates with reference light the recording medium on which information is recorded comprises a lens that transmits the reference light emitted from the light source unit, a mirror that directs the light transmitted through the lens towards the recording medium, and first driving means that changes the orientation of the lens. Therefore, the first driving means or second driving means can drive the orientation of the lens or the orientation of a cylinder, in which the lens and the light source unit are integrated, independently in the multiplex direction and the arrangement direction. Consequently, the first driving means or the second driving means can drive the lens in the multiplex direction and the arrangement direction. Thus, in reproducing hologram information, even if the light source unit is switched, the information can be precisely reproduced, and the hologram information on which angle multiplexing is performed can be precisely reproduced.

BEST MODE FOR CARRYING OUT THE INVENTION

Embodiments of the present invention will hereunder be described in detail with reference to the attached drawings.

First Embodiment

Figure 1:
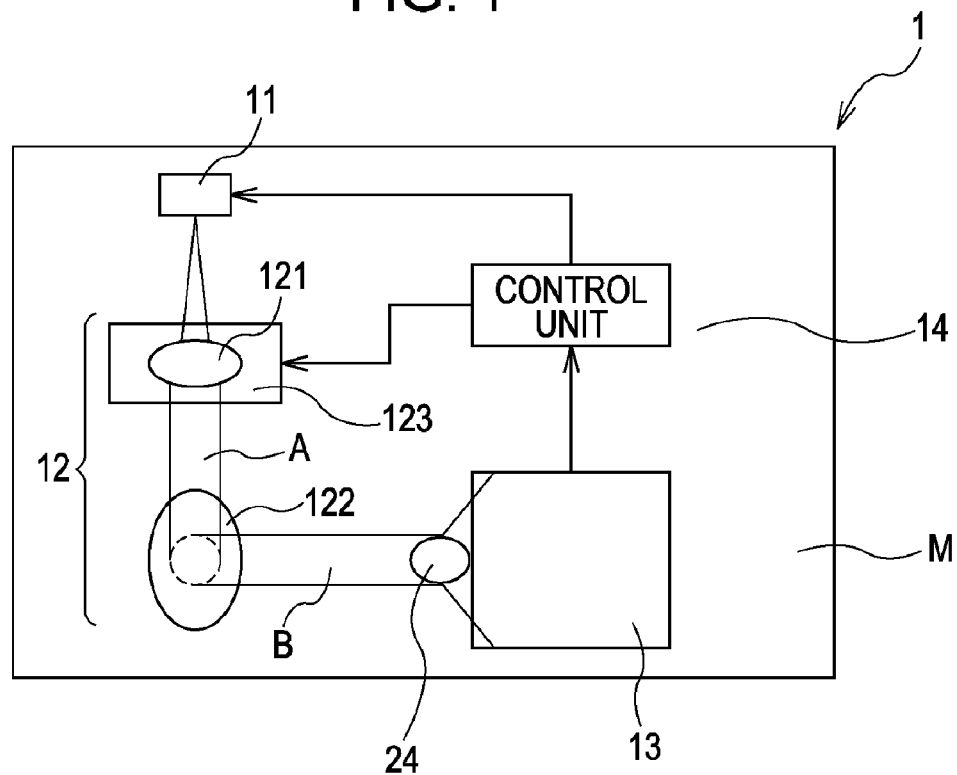
FIG. 1 is a top view of a schematic structure of a hologram information reproducing device according to a first embodiment of the present invention.
Figure 2:
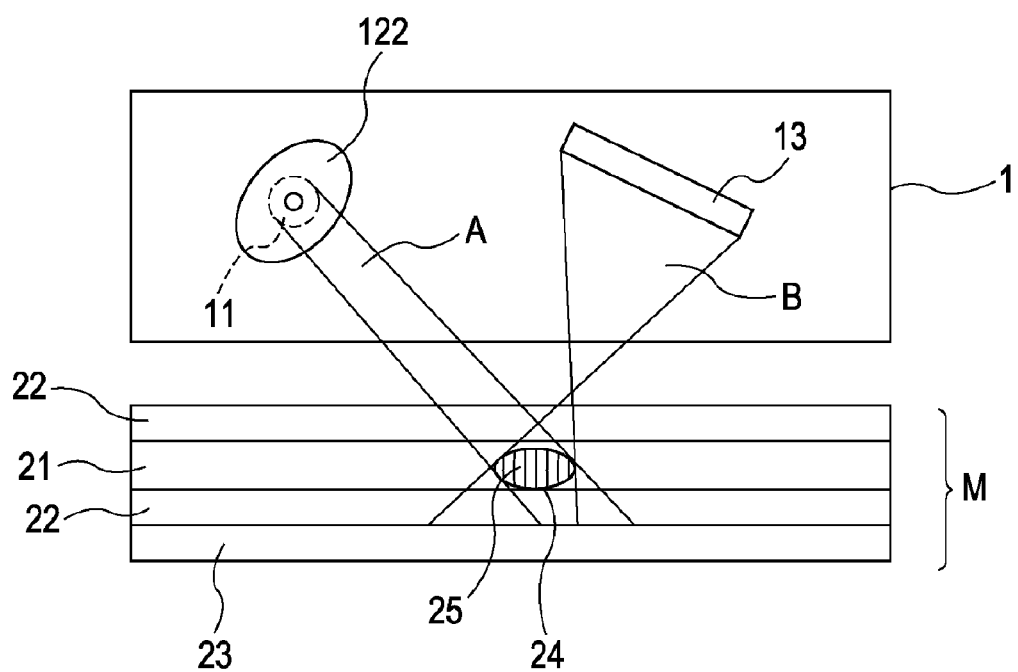
FIG. 2 is a side view of the hologram information reproducing device shown in FIG. 1.

FIG. 1 is a top view of a schematic structure of a hologram information reproducing device according to a first embodiment of the present invention. FIG. 2 is a side view of the hologram information reproducing device shown in FIG. 1.

A hologram information reproducing device 1 shown in FIG. 1 primarily comprises a light source unit 11 that emits reference light, an optical system 12 that irradiates with the reference light a recording medium M on which information is recorded, a photodetector 13 (serving as detecting means) that detects reproduction light obtained as a result of diffraction of the reference light at the recording medium M, and a control unit 14 that performs, for example, switching of the light source unit 11, driving of a lens, and processing of a reproduction signal obtained from the reproduction light. The optical system 12 is disposed on the same side as the light source unit 11 with respect to the recording medium M. The light source unit 11 comprises a light-source array in which a plurality of light sources (here, three light sources), having different wavelength ranges, are arranged in parallel. The number of light sources is not limited to three, so that it may be two, or four or more.

The optical system 12 comprises a lens 121 that transmits emission light from the light source 11 and that converts it into reference light A, which is parallel light, a mirror 122 that directs towards the recording medium M the reference light A transmitted through the lens 121, and a lens actuator 123 (serving as first driving means) that changes the orientation of the lens 121. The recording medium M comprises, for example, a recording layer 21 on which an interference fringe is recorded, a transparent substrate 22 that clamps the recording medium 21, and a reflecting layer 23 (serving as reflecting means) that reflects reproduction light B, obtained by diffracting the reference light A, towards the photodetector 13. The reflecting layer 23 is provided at the lowest layer of the recording medium M. In the recording medium M, the recording layer 21 is formed of, for example, a resinous material, such as photopolymer, and the transparent substrate 22 is formed of, for example, polycarbonate, acryl, or glass.

In the recording medium M, when the expansion coefficient of the recording layer 21 is larger than the expansion coefficient of the transparent substrate 22, the recording layer 21 expands considerably perpendicularly to a surface of the transparent substrate 22. In addition, when the recording layer 21 is clamped or supported by the transparent substrate 22, expansion that is based on, for example, a temperature change does not easily occur in a direction along the surface of the transparent substrate 22, but primarily occurs in a direction perpendicular to the surface of the transparent substrate 22. Therefore, the recording medium M from which information is reproduced by the hologram information reproducing device according to the present invention has hologram information (an interference fringe 25) formed in the thickness direction of the recording medium M (for example, in a direction substantially perpendicular to a surface of the recording medium M). The interference fringe 25 can be formed on an information recording area of the recording medium M by irradiating the recording medium M with the reference light and signal light from the same surface side thereof.

By using the recording medium M, even if, when reproducing information, the recording medium M, for example, expands, it is possible to reduce or prevent a change in hologram information (that is, a change in the width of the interference pattern) compared to when a reflecting hologram is used. In addition, since the recording medium M has the reflecting layer 23, when, in reproducing information, the recording medium M is irradiated with reference light based on the same condition from a side where the reflecting layer 23 is not formed, reproduction light (that is, diffracted hologram information) can be obtained from the light reflected by the reflecting layer 23. Therefore, in the hologram information reproducing device 1, the reproduction light B can be detected by the photodetector 13 disposed at a side where the irradiation of the reference light A is performed. Consequently, the photodetector 13 can be disposed on the same side as the light source unit 11 with respect to the recording medium M. Thus, compared to the structure in which the photodetector 13 is disposed on the opposite side of the light source unit 11 with respect to the recording medium M, structural components can be concentrated on the same side with respect to the recording medium M, so that the size of the entire device can be reduced.

The photodetector 13 comprises a two-dimensional light-receiving cell array corresponding to a two-dimensional pattern of the reproduction light. The array may be, for example, a PD array, a CCD device array, or a CMOS device array.

Figure 3:
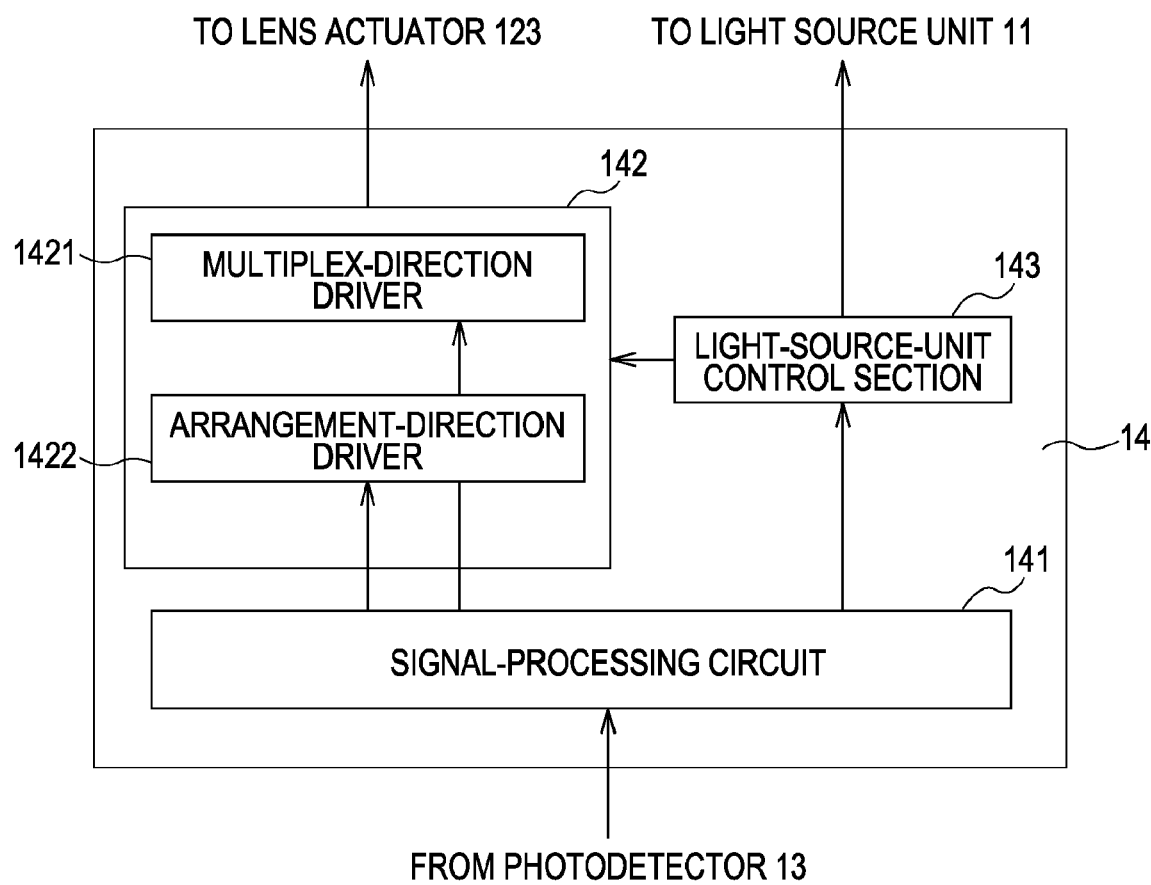
FIG. 3 is a block diagram of the structure of a control unit of the hologram information reproducing device shown in FIG. 1.

As shown in FIG. 3, the control unit 14 comprises a signal processing circuit 141 that performs signal processing on a reproduction signal based on the reproduction light obtained from the recording medium M, a driving section 142 that changes the orientation of the lens 121 on the basis of the processing result at the signal processing circuit 141, and a light-source-unit control section 143 that switches the light source unit 11 on the basis of the processing result at the signal processing circuit 141. The driving section 142 comprises a multiplex-direction driver 1421 and an arrangement-direction driver 1422. The multiplex-direction driver 1421 drives the lens in a direction of multiplexing hologram information with respect to the recording medium M, that is a direction (Bragg direction, a first direction) in which the irradiation angle with respect to the recording medium M is changed. The arrangement-direction driver 1422 drives the lens in a direction (second direction) in which the plurality of light sources are arranged in the light source unit 11. The first direction corresponds to a direction in which the orientation of the lens 121 is changed when reproducing information from the recording medium M, whereas the second direction corresponds to the direction of arrangement of the light sources in the light source array.

Next, the structure of the lens actuator 123 will be described. FIGS. 4(a) to 4(c) show the structure of the lens actuator in the hologram information reproducing device according to the first embodiment of the present invention, with FIG. 4(a) being a side view thereof, FIG. 4(b) being a top view thereof, and FIG. 4(c) showing the structure as viewed from the direction of an arrow shown in FIG. 4(a).

In the lens actuator 123, the lens 121 is mounted to a first supporting member 31. The first supporting member 31 and a second supporting member 33, disposed adjacent to the light source unit 11 so as to be separated from the first supporting member 31 by a predetermined interval, are such that their principal surfaces face each other. Four wires 32a to 32d are provided between the principal surfaces. That is, the four wires 32a to 32d are mounted, respectively, to four corners of the first supporting member 31 at one end; and are mounted, respectively, to four corners of the second supporting member 33 at the other end. This causes the lens 121 that is mounted to the first supporting member 31 to be suspended.

A first coil 34 and a second coil 35 are disposed near the lens 121 of the first supporting member 31. The first coil 34 is disposed so that its longitudinal direction is positioned along a plane defined by the wires 32a and 32d and a plane defined by the wires 32b and 32c. The second coil 35 is disposed so that its longitudinal direction is positioned along a plane defined by the wires 32a and 32b and a plane defined by the wires 32c and 32d. Magnets 36 are disposed near the first coil 34 and the second coil 35. Each magnet 36 has a substantially rectangular annular form. The first coil 34 and the second coil 35 constitute a magnetic circuit.

In the lens actuator 123, by passing electrical current through the first coil 34, the lens 121 can be driven in accordance with the direction (second direction) of arrangement of the light sources 11a to 11c of the light source unit 11 (that is, the orientation of the lens 121 is driven horizontally). In addition, by passing electrical current through the second coil 35, the lens 121 can be driven in accordance with the direction (Bragg direction, first direction) in which the irradiation angle with respect to the recording medium M is changed (that is, the orientation of the lens 121 is driven vertically). The first direction and the second direction are set so as to be substantially perpendicular to each other. This makes it possible for the lens actuator 123 to drive the orientation of the lens 121 independently in the multiplex direction and the arrangement direction. Therefore, the lens actuator 123 can drive the lens 121 in the multiplex direction and the arrangement direction. Thus, in reproducing hologram information, even if the light source unit 11 is switched, the information can be precisely reproduced, and the hologram information on which angle multiplexing is performed can be precisely reproduced.

In the hologram information reproducing device having the above-described structure, as shown in FIGS. 1 and 2, when light from the light source unit 11 is emitted, the light is converted into the reference light A, which is parallel light, by the lens 121 of the optical system 12. The mirror 122 changes the orientation of the reference light A so that it is oriented obliquely downward towards the recording medium M. More specifically, as shown in FIG. 1, as viewed from the top, the mirror 122 changes a path of the light from the light source unit 11 by approximately 90 degrees. In addition, as shown in FIG. 2, as viewed from the side, the mirror 122 changes the path of the light from the light source unit 11 downward by approximately 45 degrees. Since the interference pattern 25 recorded on the recording medium M is a Bragg grating, when the reference light A illuminates a recording area 24 of the recording medium M, the reproduction light B is obtained by Bragg diffraction. If the wavelength of the light (for reproduction information) from the light source unit 11 is substantially the same as the wavelength of the light for recording information, the hologram information recorded on a page can be reproduced. The reproduction light B is reflected by the reflecting layer 23 of the recording medium M, and is detected by the photodetector 13. The reproduction light B detected by the photodetector 13 is transmitted as a reproduction signal to the signal processing circuit 141 of the control unit 14 shown in FIG. 3. At the signal processing circuit 141, the diffracted intensity of the reproduction signal is measured. If the measured diffracted intensity exceeds a predetermined value (threshold value), hologram information is obtained from the reproduction signal.

Here, when the recording medium M expands or contracts due to external temperature, information needs to be reproduced considering this expansion or contraction. For example, light in a wavelength range of one light source may not be able to reproduce the information due to the external temperature than the information recording temperature. In such a case, the light source is switched to a light source having a different wavelength range, to reproduce the information. More specifically, the diffracted intensity of reproduction light based on light emitted from one light source, such as the light source 11a shown in FIG. 4(b), is measured. If the diffracted intensity is less than a predetermined value, the light-source-unit control section 143 corrects the wavelength of the light source 11a by a predetermined amount, to measure the diffracted intensity of the reproduction light based on the light whose wavelength has been corrected. If, within the wavelength range of the light source 11a, the diffracted intensity of the reproduction light does not exceed a predetermined value, the light-source-unit control section 143 switches the light source unit 11. Here, the light source 11a is switched to the light source 11b. Then, similarly to the above, the diffracted intensity of reproduction light based on light emitted from the light source 11b is measured, to determine a threshold value with respect to the diffracted intensity. If the measured diffracted intensity exceeds the threshold value, hologram information is obtained from a reproduction signal thereof.

When the light source 11a is switched to the light source 11b, since the position of the light source 11a and the position of the light source 11b differ from each other, it is necessary to change the orientation of the lens 121 by the lens actuator 123. That is, the orientation of the lens 121 is changed in accordance with a shift in the position of the light source. By this, even if the position of the light source is changed, hologram information can be precisely reproduced using the reproduction light. More specifically, a control signal for switching a light source by the light-source-unit control section 143 is sent not only to the light source unit 11, but also to the arrangement-direction driver 1422 of the driving section 142. At the arrangement-direction driver 1422, a control signal that drives the orientation of the lens 121 in the light-source arrangement direction (second direction) is output to the lens actuator 123 in accordance with this control signal. In the lens actuator 123, in accordance with this control signal, electrical current is passed through the first coil 34 to change the orientation of the lens 121 along the arrangement direction. Since the distances between the light sources 11a to 11c in the light source unit 11 are previously determined, when electrical current of an amount that is previously set in accordance with the distances is passed through the first coil 34, it is possible to change the orientation of the lens 121 by an angle that is shifted when the light source is switched.

When reproducing hologram information from the recording medium M in which multiplex recording of the hologram information is performed on the same recording area 24 as a result of changing the irradiation angle (which is a multiplexing parameter), the orientation of the lens 121 needs to be changed by the lens actuator 123. That is, the orientation of the lens 121 is changed in accordance with the shifting of the irradiation angle that is changed when multiplexing is performed on the same recording area 24. This makes it possible to precisely reproduce the hologram information that is multiplexed at the same recording area 24. More specifically, from the signal processing circuit 141, a control signal for changing the multiplexing parameter is sent to the multiplex-direction driver 1421 of the driving section 142. At the multiplex-direction driver 1421, a control signal that drives the orientation of the lens 121 in the multiplex direction (first direction) is output to the lens actuator 123 in accordance with this control signal. In the lens actuator 123, in accordance with this control signal, electrical current is passed through the second coil 35 to change the orientation of the lens 121 along the arrangement direction. Since the shifting amount of the irradiation angle when performing multiplexing recording is previously determined, when electrical current of an amount that is previously set in accordance with the shifting amount is passed through the second coil 35, it is possible to change the orientation of the lens 121 by an angle corresponding to the shifting amount of the irradiation angle. At a certain irradiation angle, the diffracted intensity of reproduction light based on light emitted from the light source 11a is measured. If the diffracted intensity is less than a predetermined value, the angle of the lens 121 is corrected by a predetermined amount by the multiplex-direction driver 1421, to measure the diffracted intensity of the reproduction light based on the light whose irradiation angle has been corrected. If the measured diffracted intensity exceeds a threshold value, hologram information is obtained from a reproduction signal thereof. Ordinarily, the correction amount can be determined by, for example, PID control.

Accordingly, in the hologram information reproducing device according to the embodiment, as shown in FIG. 1, as viewed from the top, the mirror 122 changes a path of the light from the light source unit 11 by approximately 90 degrees. In addition, as shown in FIG. 2, as viewed from the side, the mirror 122 changes the path of the light from the light source unit 11 downward by approximately 45 degrees. Further, since the photodetector 13 is disposed on the same side as the light source unit 11 with respect to the recording medium M, compared to the structure in which the photodetector 13 is disposed opposite to the light source unit 11 with respect to the recording medium M, structural components can be concentrated on the same side with respect to the recording medium M, so that the size of the entire device can be reduced. In addition, since the lens actuator 123 can drive the orientation of the lens 121 independently in the multiplex direction and the arrangement direction (biaxial directions), the lens actuator 123 can drive the lens 121 in the multiplex direction and the arrangement direction. Therefore, in reproducing hologram information, even if the light source unit 11 is switched, the information can be precisely reproduced, and the hologram information on which angle multiplexing is performed can be precisely reproduced.

Second Embodiment

Figure 4:
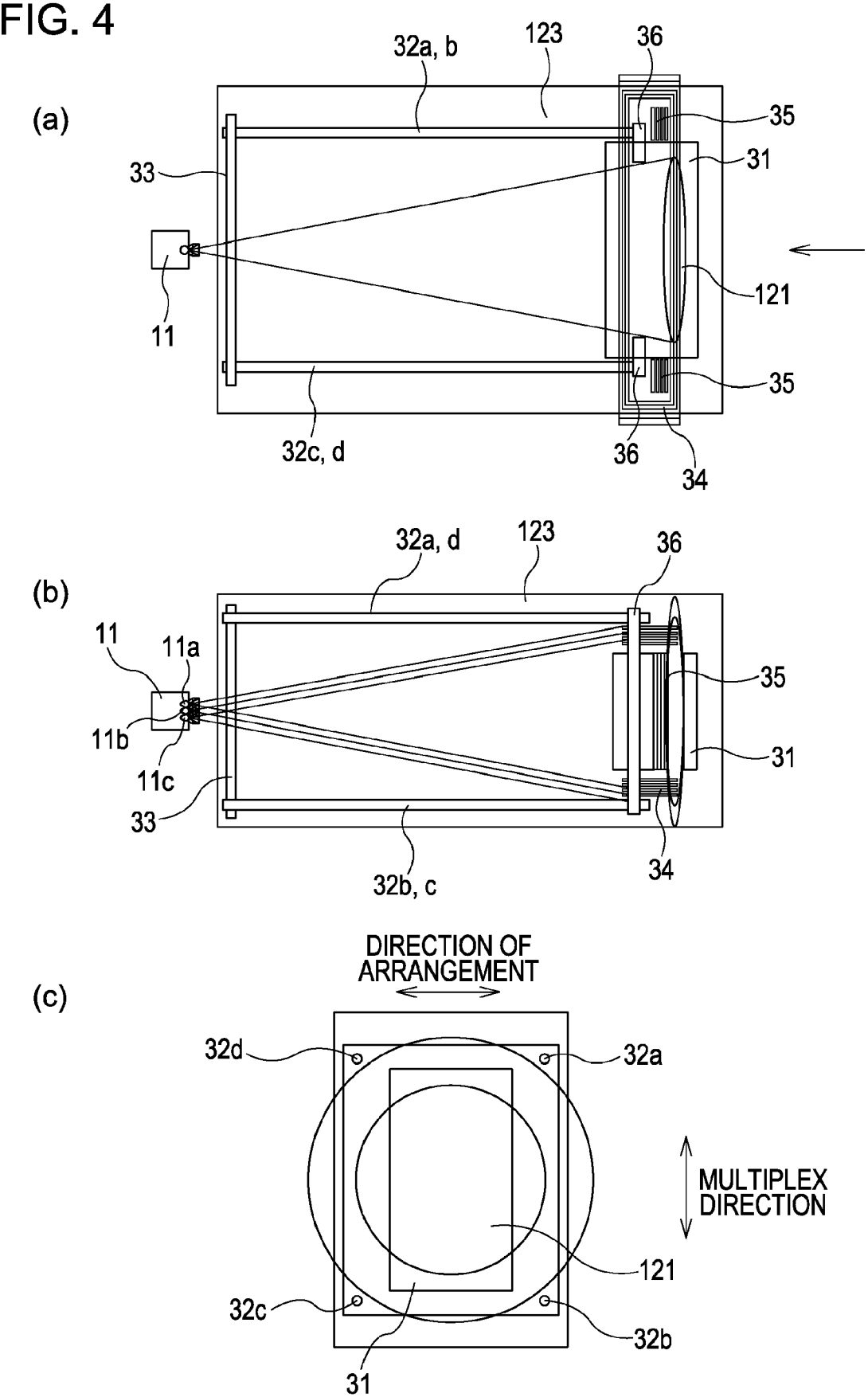
FIGS. 4(a) to 4(c) show the structure of a lens actuator in the hologram information reproducing device according to the first embodiment of the present invention, with FIG. 4(a) being a side view thereof, FIG. 4(b) being a top view thereof, and FIG. 4(c) showing the structure as viewed from the direction of an arrow shown in FIG. 4(a).
Figure 5:
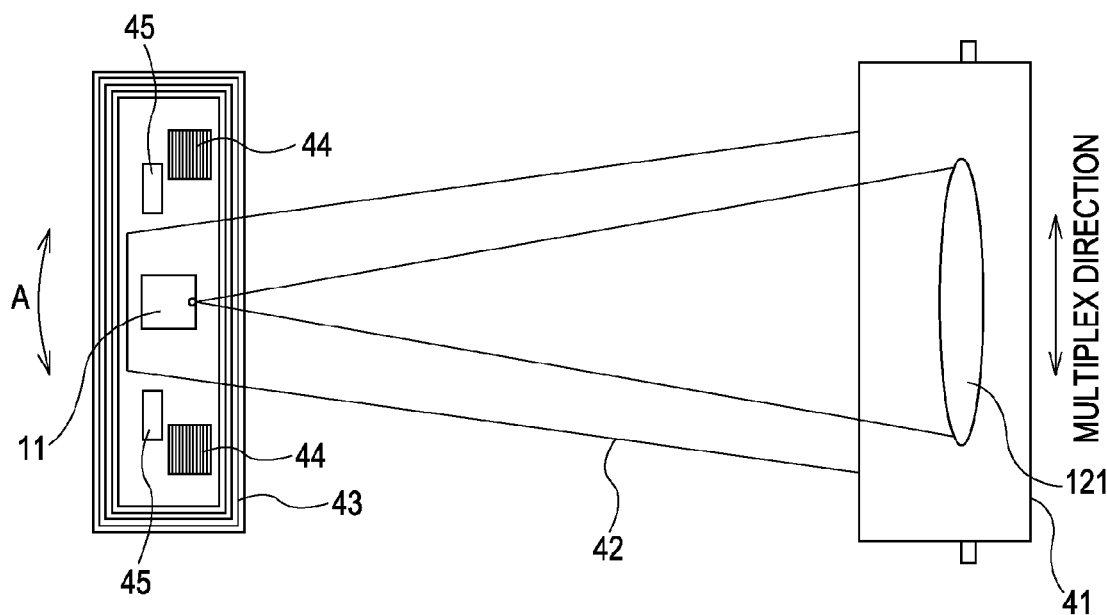
FIGS. 5(a) and 5(b) illustrate the structure of a cylinder actuator in a hologram information reproducing device according to a second embodiment of the present invention, with FIG. 5(a) being a side view thereof and FIG. 5(b) being a top view thereof.
Figure 5:
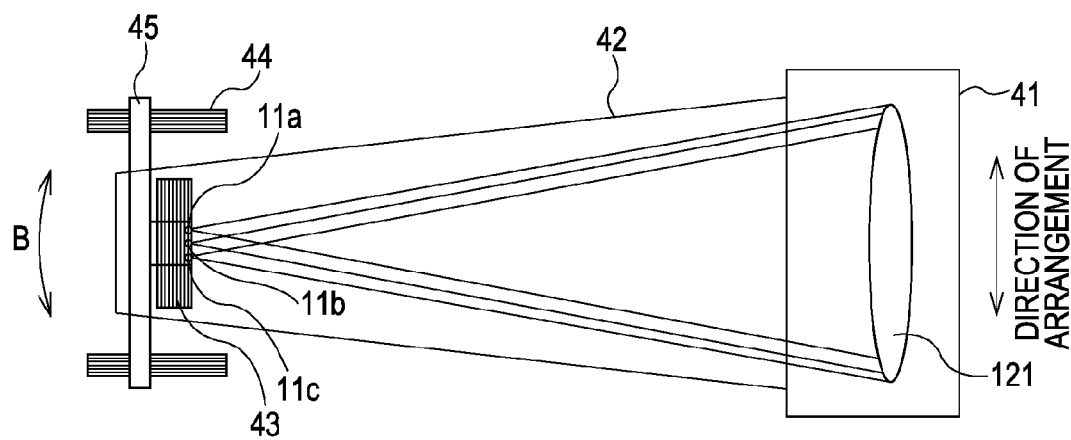

In the embodiment, the case in which the orientation of a lens is independently driven in a multiplex direction and an arrangement direction by driving a cylinder integrated to the lens will be described. FIGS. 5(a) and 5(b) illustrate the structure of a cylinder actuator in a hologram information reproducing device according to a second embodiment of the present invention, with FIG. 5(a) being a side view thereof and FIG. 5(b) being a top view thereof. In FIG. 5, portions corresponding to those in FIG. 4 are given the same reference numerals as those in FIG. 4, and will not be described in detail below.

Figure 6:
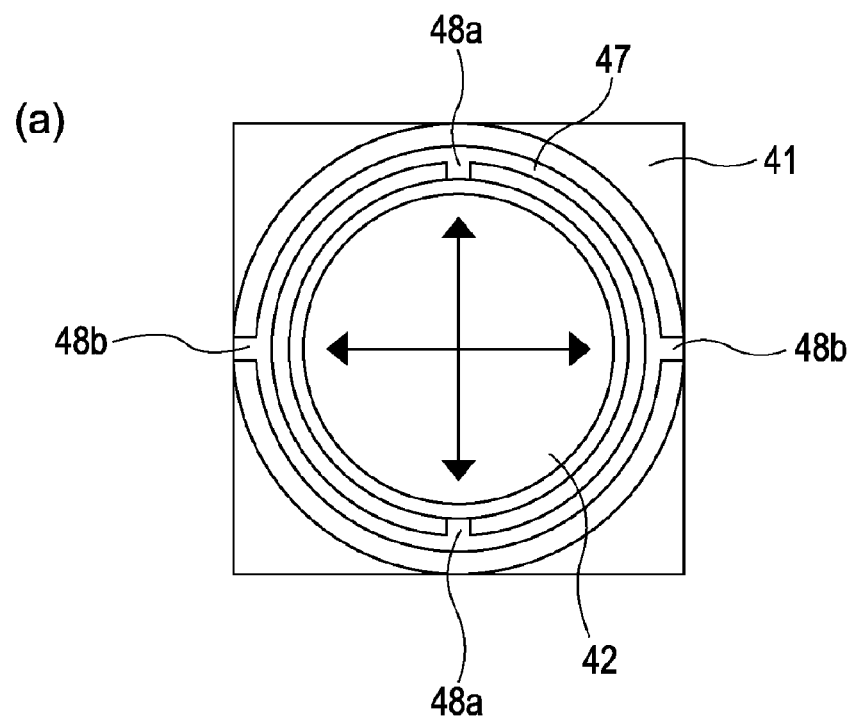
FIGS. 6(a) and 6(b) show a driving structure of a cylinder in the hologram information reproducing device according to the second embodiment of the present invention.
Figure 6:
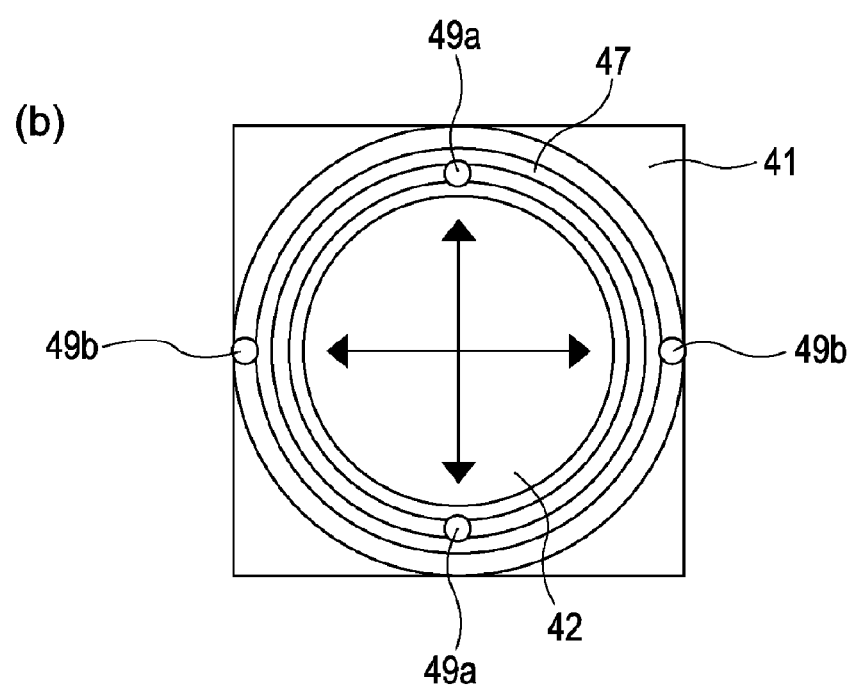

The hologram information reproducing device according to the second embodiment has the same structure as that of the first embodiment except that a cylinder actuator that changes the orientation of a cylinder is used instead of the lens actuator 123. As shown in FIGS. 5(a) and 5(b), a cylinder 42 has a structure in which a lens 121, which transmits light from a light source unit 11, and the light source unit 11 are integrated to each other. More specifically, in the cylinder actuator, the cylinder 42 is mounted to a supporting member 41. The supporting member 41 and the cylinder 42 are mounted to each other in, for example, a structure shown in FIG. 6. As shown in FIG. 6(a), the cylinder 42 is mounted to the supporting member 41 through a resilient plate 47, supporting portions 48a are provided between the resilient plate 47 and the cylinder 42, and supporting portions 48b are provided between the resilient plate 47 and the supporting member 41. The supporting portions 48a between the resilient member 47 and the cylinder 42 are disposed at positions that are vertically opposite to each other, and the supporting portions 48b between the resilient plate 47 and the supporting member 41 are disposed at positions that are horizontally opposite to each other. Accordingly, by interposing the resilient plate 47 between the supporting member 41 and the cylinder 42 using the supporting portions 48a and 48b, the cylinder 42 can be driven biaxially. As shown in FIG. 6(b), even if ball bearings 49a are provided between the resilient plate 47 and the cylinder 42 and ball bearings 49b are provided between the resilient plate 47 and the supporting member 41, the cylinder 42 can be driven biaxially.

A first coil 43 and a second coil 44 are disposed at a light-source-unit-11 (end) side of the cylinder 42. As shown in FIG. 5(a), the first coil 43 is disposed so that its longitudinal direction is positioned along a side surface of the cylinder 42. The second coil 44 is disposed so that its longitudinal direction is positioned along the top surface and the bottom surface of the cylinder 42. Magnets 45 are disposed near the first coil 43 and the second coil 44. Each magnet 45 has a substantially rectangular annular form. The first coil 43 and the second coil 44 constitute a magnetic circuit.

In the cylinder actuator, by passing electrical current through the first coil 43, the cylinder 42 can be driven in accordance with a direction (second direction) of arrangement of a plurality of light sources 11a to 11c of the light source unit 11 (that is, the orientation of the cylinder 42 can be driven horizontally). In addition, by passing electrical current through the second coil 44, the cylinder 42 can be driven in accordance with a direction (Bragg direction, first direction) in which the irradiation angle with respect to a recording medium M is changed (that is, the orientation of the cylinder 42 is driven vertically). The first direction and the second direction are set so as to be substantially perpendicular to each other. This makes it possible for the cylinder actuator to drive the orientation of the cylinder 42 independently in the multiplex direction and the arrangement direction. Therefore, the cylinder actuator can drive the lens 121 in the multiplex direction and the arrangement direction. Thus, in reproducing hologram information, even if the light source unit 11 is switched, the information can be precisely reproduced, and the hologram information on which angle multiplexing is performed can be precisely reproduced.

In the hologram information reproducing device having the above-described structure, the cylinder actuator changes the orientation of the cylinder 42 to change the orientation of the lens 121. The basic operations are similar to those in the first embodiment. That is, as viewed from the top, a mirror 122 changes a path of light from the light source unit 11 by approximately 90 degrees. In addition, as viewed from the side, the mirror 122 changes the path of the light from the light source unit 11 downward by approximately 45 degrees. Since an interference pattern 25 recorded on the recording medium M is a Bragg grating, when light A illuminates a recording area 24 of the recording medium M, reproduction light B is obtained by Bragg diffraction. The reproduction light B is reflected by a reflecting layer 23 of the recording medium M, and is detected by a photodetector 13. The reproduction light B detected by the photodetector 13 is transmitted as a reproduction signal to the signal processing circuit 141 of the control unit 14 shown in FIG. 3. At the signal processing circuit 141, the diffracted intensity of the reproduction signal is measured. If the measured diffracted intensity exceeds a predetermined value (threshold value), hologram information is obtained from the reproduction signal.

Here, when the recording medium M expands or contracts due to external temperature, information needs to be reproduced considering this expansion or contraction as in the first embodiment. When the light source 11a is switched to the light source 11b, since the position of the light source 11a and the position of the light source 11b differ from each other, it is necessary to change the orientation of the cylinder 42 by the cylinder actuator. That is, the orientation of the cylinder 42 is changed in accordance with a shift in the position of the light source. By this, even if the position of the light source is changed, hologram information can be precisely reproduced using the reproduction light. More specifically, a control signal for switching a light source by the light-source-unit control section 143 is sent not only to the light source unit 11, but also to the arrangement-direction driver 1422 of the driving section 142. At the arrangement-direction driver 1422, a control signal that drives the orientation of the cylinder 42 in the light-source arrangement direction (second direction) is output to the cylinder actuator in accordance with this control signal. In the cylinder actuator, in accordance with this control signal, electrical current is passed through the first coil 43 to change the orientation of the cylinder 42 along the arrangement direction. Since the distances between the light sources 11a to 11c in the light source unit 11 are previously determined, when electrical current of an amount that is previously set in accordance with the distances is passed through the first coil 43, it is possible to change the orientation of the lens 121 by an angle that is shifted when the light source is switched.

When reproducing hologram information from the recording medium M in which multiplex recording of the hologram information is performed on the same recording area 24 as a result of changing the irradiation angle (which is a multiplexing parameter), the orientation of the cylinder 42 needs to be changed by the cylinder actuator. That is, the orientation of the cylinder 42 is changed in accordance with the shifting of the irradiation angle that is changed when multiplexing is performed on the same recording area 24. This makes it possible to precisely reproduce the hologram information that is multiplexed at the same recording area 24. More specifically, from the signal processing circuit 141, a control signal for changing the multiplexing parameter is sent to the multiplex-direction driver 1421 of the driving section 142. At the multiplex-direction driver 1421, a control signal that drives the orientation of the cylinder 42 in the multiplex direction (first direction) is output to the cylinder actuator in accordance with this control signal. In the cylinder actuator, in accordance with this control signal, electrical current is passed through the second coil 44 to change the orientation of the cylinder 42 along the arrangement direction. Since the shifting amount of the irradiation angle when performing multiplexing recording is previously determined, when electrical current of an amount that is previously set in accordance with the shifting amount is passed through the second coil 44, it is possible to change the orientation of the lens 121 by an angle corresponding to the shifting amount of the irradiation angle. At a certain irradiation angle, the diffracted intensity of reproduction light based on light emitted from the light source 11a is measured. If the diffracted intensity is less than a predetermined value, the angle of the cylinder 42 is corrected by a predetermined amount by the multiplex-direction driver 1421, to measure the diffracted intensity of the reproduction light based on the light whose irradiation angle has been corrected. If the measured diffracted intensity exceeds a threshold value, hologram information is obtained from a reproduction signal thereof. Ordinarily, the correction amount can be determined by, for example, PID control.

Accordingly, in the hologram information reproducing device according to the embodiment, as shown in FIG. 1, as viewed from the top, the mirror 122 changes a path of the light from the light source unit 11 by approximately 90 degrees. In addition, as shown in FIG. 2, as viewed from the side, the mirror 122 changes the path of the light from the light source unit 11 downward by approximately 45 degrees. Further, since the photodetector 13 is disposed on the same side as the light source unit 11 with respect to the recording medium M, compared to the structure in which the photodetector 13 is disposed opposite to the light source unit 11 with respect to the recording medium M, structural components can be concentrated on the same side with respect to the recording medium M, so that the size of the entire device can be reduced. In addition, since the cylinder actuator can drive the orientation of the cylinder 42 independently in the multiplex direction and the arrangement direction (biaxial directions), the cylinder actuator can drive the lens 121 in the multiplex direction and the arrangement direction. Therefore, in reproducing hologram information, even if the light source unit 11 is switched, the information can be precisely reproduced, and the hologram information on which angle multiplexing is performed can be precisely reproduced.

The present invention is not limited to the first and second embodiments, so that various modifications may be made to carry out the invention. Although, in each of the first and second embodiments, the lens or the cylinder is driven using a magnetic circuit including a coil and a magnet, the lens or the cylinder may be driven using a piezoelectric circuit which uses a piezo element in the present invention. Further, other modifications may be made as appropriate within the scope of the object of the present invention, to carry out the invention.

The invention claimed is:

1. A hologram information reproducing device comprising:
   a light source unit that emits reference light;
   an optical system that irradiates with the reference light, a recording medium on which information is recorded in a multiplex manner; and
   detecting means that is disposed on the same side as the light source unit with respect to the recording medium and that detects reproduction light that is obtained as a result of diffracting the reference light at the recording medium,
   wherein the optical system includes a lens that transmits the reference light emitted from the light source unit, a mirror that directs the light transmitted through the lens towards the recording medium, and a first driver that changes the orientation of the lens, and
   wherein the first driver changes the orientation of the lens in a multiplex direction of the information recorded on the recording medium when the information is reproduced from the recording medium, the multiplex direction corresponding to a direction substantially perpendicular to a surface of the recording medium.

2. The hologram information reproducing device according to claim 1 wherein the optical system further includes:
   a cylinder integrated with the light source unit; and
   a second driver arranged to the orientation of the cylinder.

3. The hologram information reproducing device according to claim 2 wherein the light source unit has a light source array including a plurality of light sources, and wherein at least one of the first driver and the second driver changes the orientation of the lens in a second direction in correspondence with a direction of arrangement of the light sources in the light source array.

4. The hologram information reproducing device according to claim 3 further comprising controlling means that drives the first driver in accordance with the multiplex direction of the information recorded on the recording medium, and that drives the second driver in accordance with the direction of arrangement of the light sources in the light source array.

5. The hologram information reproducing device according to claim 1 wherein the first driver drives the lens by a magnetic circuit.

6. The hologram information reproducing device according to claim 1 wherein the recording medium has reflecting means that reflects the reproduction light, obtained by diffracting the reference light, towards the detecting means.

7. The hologram information reproducing device comprising:
   a light source unit that emits reference light;
   an optical system that irradiates with the reference light, a recording medium on which information is recorded in a multiplex manner; and
   detecting means that is disposed on the same side as the light source unit with respect to the recording medium and that detects reproduction light that is obtained as a result of diffracting the reference light at the recording medium,
   wherein the optical system includes a lens that transmits the reference light emitted from the light source unit, a mirror that directs the light transmitted through the lens towards the recording medium, and a first driver that changes the orientation of the lens, and
   wherein the first driver changes the orientation of the lens in a first direction corresponding to a multiplex direction of the information recorded on the recording medium when the information is reproduced from the recording medium,
   and wherein the light source unit has a light source array including a plurality of light sources, and wherein the first driver changes the orientation of the lens in a second direction corresponding to a direction of arrangement of the light sources in the light source array.

8. The hologram information reproducing device according to claim 7 wherein the first and second directions are substantially perpendicular to each other, and the first driver changes the orientation of the lens in the first direction and the second direction.

9. The hologram information reproducing device according to claim 7 further comprising controlling means that drives the first driver in accordance with the multiplex direction of the information recorded on the recording medium.

10. The hologram information reproducing device according to claim 7 wherein the first driver drives the lens by a magnetic circuit.

11. The hologram information reproducing device according to claim 7 wherein the recording medium has reflecting means that reflects the reproduction light, obtained by diffracting the reference light, towards the detecting means.

* * * * *